(12) United States Patent
Bronder et al.

(10) Patent No.: US 10,354,531 B1
(45) Date of Patent: Jul. 16, 2019

(54) SYSTEM AND METHOD FOR IDENTIFYING AVAILABLE PARKING LOCATIONS

(71) Applicant: Apple Inc., Cupertino, CA (US)

(72) Inventors: Kjell F. Bronder, San Francisco, CA (US); Scott M. Herz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 15/267,745

(22) Filed: Sep. 16, 2016

Related U.S. Application Data

(60) Provisional application No. 62/233,204, filed on Sep. 25, 2015.

(51) Int. Cl.
*G08G 1/14* (2006.01)
*G06F 16/29* (2019.01)

(52) U.S. Cl.
CPC ............ *G08G 1/144* (2013.01); *G06F 16/29* (2019.01); *G08G 1/141* (2013.01); *G08G 1/146* (2013.01)

(58) Field of Classification Search
CPC ........ G08G 1/144; G08G 1/141; G08G 1/146; G06F 17/30241
See application file for complete search history.

(56) References Cited

U.S. PATENT DOCUMENTS

| | | | | |
|---|---|---|---|---|
| 2014/0232569 A1* | 8/2014 | Skinder | ................. | G01C 21/16 340/989 |
| 2014/0266800 A1* | 9/2014 | Koukoumidis | ........ | G08G 1/141 340/932.2 |
| 2015/0373482 A1* | 12/2015 | Barnard | ............. | H05B 37/0272 370/338 |
| 2016/0163197 A1* | 6/2016 | Levy | ...................... | G08G 1/147 340/932.2 |

OTHER PUBLICATIONS

Kopecký et al., "ParkJam: Crowdsourcing Parking Availability Information with Linked Data (Demo)," Knowlege Media Institute, The Open University, UK, 9th Extended Semantic Web Conference (ESWC 2012), May 27-31, 2012, Heraklion, Greece.
Garling, "Smartphone Movements Could Reveal Empty Parking Spots," MIT Technology Review, Sep. 15, 2014, https://www.technologyreview.com/s/530671/smartphone-movements-could-reveal-empty-parking-spots/, accessed Oct. 11, 2017.
Peters, "How Your Car Can Find You a Parking Spot Without Circling the Block," Fast Company, Jan. 21, 2015, https://www.fastcompany.com/3040684/how-your-car-can-find-you-a-parking-spot-without-circling-the-block, accessed Oct. 11, 2017.

* cited by examiner

*Primary Examiner* — Ryan W Sherwin
(74) *Attorney, Agent, or Firm* — Polsinelli PC

(57) ABSTRACT

Aspects of the present disclosure involve a method for identifying parking locations. The current disclosure presents a technique for identifying parking locations within a geographical area. In one embodiment, a database is populated and stores information associated with parking locations. The database can include coordinates associated with parking locations and other relevant attributes. In another embodiment, the information from the database may be used to identify and present a visual representation and route to available parking locations.

24 Claims, 10 Drawing Sheets

| | Coordinates Attribute | Availability Attribute | Cost Attribute | Vehicle Type Attribute | Time Constraint Attribute | | | | | | | | | | | |
|---|---|---|---|---|---|---|---|---|---|---|---|---|---|---|---|---|
| Location 1 | x1, y1 | yes | $5.00/hr | normal | 8am-5pm | | | | | | | | | | | |
| Location 1 | x1, y1 | no | $7.00/hr | normal | | | | | | | | | | | | |
| Location 2 | x2, y2 | yes | | handicap | | | | | | | | | | | | |
| Location 3 | x3, y3 | no | $0.00/hr | compact | | | | | | | | | | | | |
| Location 4 | x4, y4 | no | | normal | 8am-5pm | | | | | | | | | | | |
| Location 5 | x5, y5 | yes | $3.00/hr | normal | 5am-10pm | | | | | | | | | | | |
| Location 6 | x6, y6 | | | | 10am-1pm | | | | | | | | | | | |
| Location 7 | x7, y7 | | | loading | | | | | | | | | | | | |
| • | | | | | | | | | | | | | | | | |
| • | | | | | | | | | | | | | | | | |
| • | | | | | | | | | | | | | | | | |
| Location n | xn, yn | | | | | | | | | | | | | | | |

*FIG. 6*

SYSTEM AND METHOD FOR IDENTIFYING AVAILABLE PARKING LOCATIONS

CROSS-REFERENCE TO RELATED APPLICATIONS

This application is related to and claims priority under 35 U.S.C. § 119 (e) to U.S. Patent Application No. 62/233,204, filed Sep. 25, 2015, entitled "DATA MANAGEMENT FOR IDENTIFYING AVAILABLE PARKING LOCATIONS," the entire contents of which are incorporated herein by reference.

TECHNICAL FIELD

This disclosure relates generally to identifying a parking location, and more specifically to automatically identifying parking locations. The disclosure further relates to using the identified parking locations to locate available parking locations on a device.

BACKGROUND

Arriving at a destination and knowing ahead of time where parking locations are available can be a more convenient way to travel. Existing solutions, particularly those accessible from a network and which can be used to comprehensively assist in navigation and locate available parking, are not available, highly localized, or otherwise highly limited.

SUMMARY

A system includes a database that stores information associated with parking locations. The database can include coordinates associated with parking locations and other relevant attributes. The information from the database may be used to identify and present a visual representation and route to available parking locations. Briefly described, and according to one embodiment, aspects of the present disclosure generally relate to systems and methods for locating available parking locations using the information from the database.

According to one embodiment, a method includes obtaining, using a processor, a first data element associated with a geographic location, the first data element indicative of a parking location at the geographic location, obtaining, using the processor, a second data element associated with the geographic location, the second data element indicative of the parking location at the geographic location, storing in a parking database, using the processor, the first data element indicative of the parking location at the geographic location and the second data element indicative of the parking location at the geographic location, and determining, using the processor, whether the parking location is occupied based on the first data element indicative of the parking location at the geographic location and the second data element indicative of the parking location at the geographic location.

According to another embodiment, a method includes accessing, using a processor, a database defining parking locations, each of the parking locations associated with a respective geographic location and an attribute, obtaining, using the processor, a geographic location at which to park, analyzing, using the processor, the attribute of each parking location within a set geographic area associated with the geographic location at which to park to identify an available parking location, generating, using the processor, a route to the available parking location, obtaining, using the processor, from the database, an indication that the available parking location has been occupied, and determining, using the processor, a different route to an alternative parking location and transmitting information associated with the different route.

According to an additional embodiment, a system includes a processor to obtain a first data element associated with a geographic location, the first data element indicative of a parking location at the geographic location, obtain a second data element associated with the geographic location, the second data element indicative of the parking location at the geographic location; store in a parking database the first data element indicative of the parking location at the geographic location and the second data element indicative of the parking location at the geographic location, and determine whether the parking location is occupied based on the first data element indicative of the parking location at the geographic location and the second data element indicative of the parking location at the geographic location.

According to another embodiment, a non-transitory computer readable medium includes instructions stored thereon that, when executed by a processor, cause the processor to perform operations including obtaining a first data element associated with a geographic location, the first data element indicative of a parking location at the geographic location, obtaining a second data element associated with the geographic location, the second data element indicative of the parking location at the geographic location, storing in a parking database the first data element indicative of the parking location at the geographic location and the second data element indicative of the parking location at the geographic location, and determining whether the parking location is occupied based on the first data element indicative of the parking location at the geographic location and the second data element indicative of the parking location at the geographic location.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIG. 6 shows an example database table storing attributes associated with parking locations.

DETAILED DESCRIPTION

Figure 1:
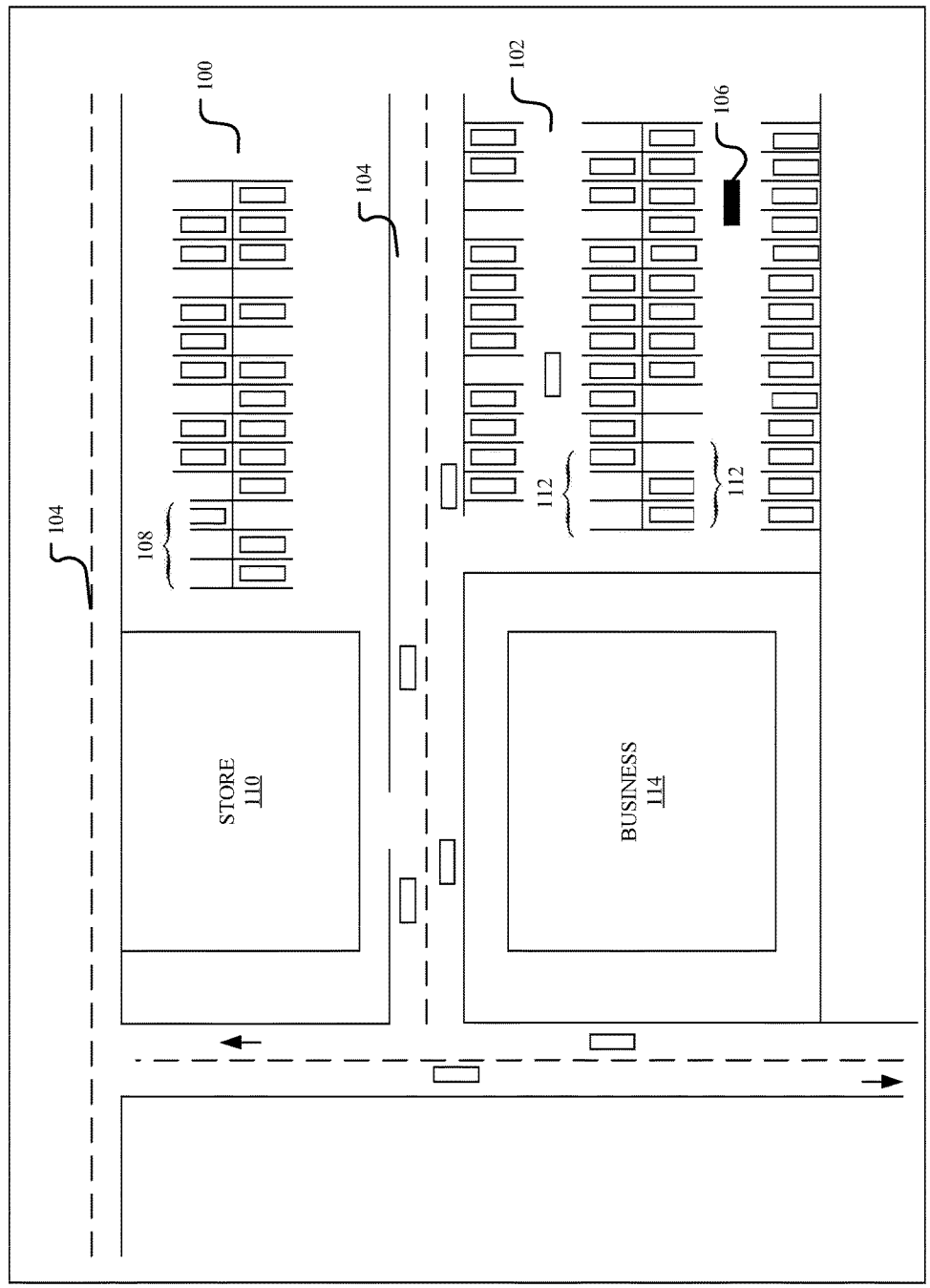
FIG. 1 is a diagram illustrating a map with a street and two parking lots.

Aspects of the present disclosure involve systems, methods, and devices for identifying parking locations and storing those parking locations in a database, map, and/or other data file, which may later be referenced or otherwise be used to guide a vehicle to a parking location. In one embodiment, parking data is collected from many possible sources to populate and store in the database. The parking data may be direct information that indicates that a particular geographical location is a parking location (or otherwise available for a vehicle to park) and/or may be indirect data that can be used, alone or in conjunction with other data, to determine whether or not a location is available for parking. The data, whether direct or indirect, may be collected via crowdsourcing, user input, through geographical mapping, using sensor enabled devices, using pre-existing localization infrastructures, using user and/or device predictive analysis, using computer vision algorithms, etc., and/or various combinations thereof. The data, particularly indirect data, may be collected and analyzed through the generation of heat maps, using statistical distributions, and using other probabilistic processes that can be used to assess the indirect data to identify a parking location and/or predict the most likely area for parking locations to be unoccupied at a certain time. Once parking locations have been identified, rules regarding the parking locations can be created to associate attributes to the parking locations. For example, a large database/repository can be built around parking spots in a major city and the attributes associated with those parking spots. For instance, the details collected regarding the parking spots in that major city (e.g., New York City) can include not only where parking spots exist, but also any use restrictions (e.g., handicap, taxi, loading/unloading, etc.), time constraints associated with the location (e.g., Monday-Friday, 8 am to 5 pm, 3 hour limit, etc.), costs, and the like. A parking database can be built for any and all geographical areas where parking locations exist.

Further aspects of the present disclosure involve using the parking information to route a vehicle to a parking location. Once parking locations have been identified and/or predicted by a management system, an application can use the repository of information to identify and route a user to available parking locations. For example, a device can present parking locations that may be available in the vicinity of a final destination. As another example, a device can be presented with a parking location and accompanying details regarding the costs associated with the parking location. Still as another example, the device can be presented with a parking location and with a time constraint associated with the parking location (e.g., available only until 10 p.m.). The list of parking locations may be sorted by proximity, price, likely availability, user calendar events, availability duration, and other attributes. Navigation instrumentation may provide a route to one of the parking locations, provide a user with a mechanism, such as a graphical user interface (GUI), whereby locations may be selected and then routes provided, or may interact with an autonomous system to automatically route a vehicle to one of the parking locations.

FIG. 1 is a diagram illustrating a map with two parking lots 100 and 102 separated by a road 104. In the parking lot 102, a vehicle 106 is illustrated navigating a parking lot 102 in search for a parking location. The parking lot may include designated areas 108 for drop-off or pick-up and delivery with a time limit (e.g., a max of 15 minutes), which are often in front of a store 110, handicapped parking spots or locations 112, which often are in designated locations near an entrance to a business 114, and other general parking spots or locations. The vehicle 106 in search of the parking location can be a road vehicle, a motorcycle, a truck, a recreational vehicle, and any other type of vehicle that might occupy the spot. The parking lot 100 is a general representation of the type of location the vehicle 106 can frequent. However, vehicular parking can be sought at in parking structures, in parking lots, on street sides, in city alleys, near stadiums, etc.

Parking in the parking lot 100 can be better facilitated if the vehicle 106 the user drives into the parking lot 100 is aware of parking availability. Understanding ahead of time where parking locations are available (or if any are available) in the parking lot 100, can provide a more efficient situation for the user. However, in order to obtain details associated with available parking locations, an inventory of the geographical location of interest should first be taken or such an inventory should otherwise be accessible. Such inventory can be determined using a system that can collect a large amount of data, process the data, and identify the parking locations.

Figure 2:
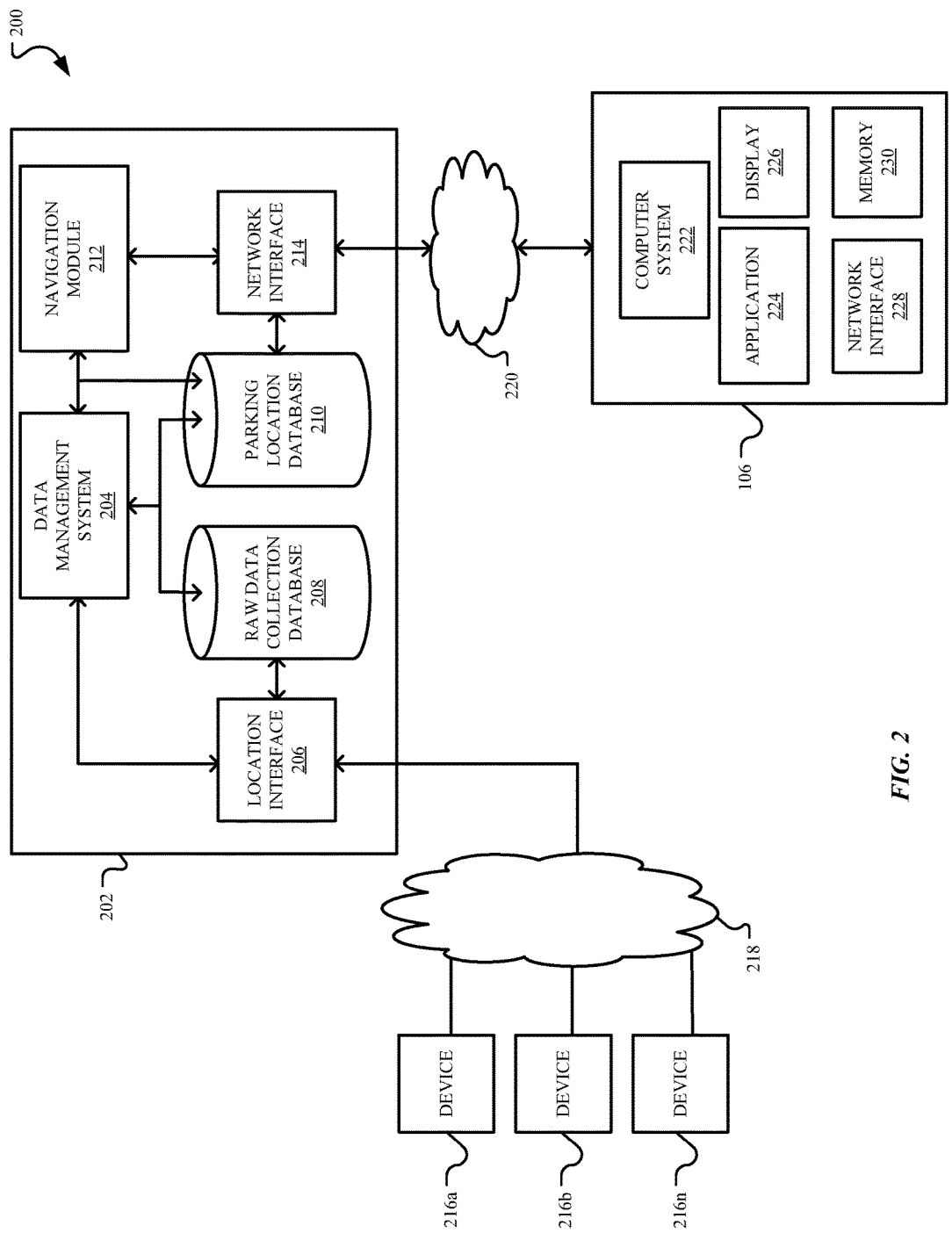
FIG. 2 is a diagram illustrating a system for identifying parking locations.

FIG. 2 is a diagram illustrating a system 200 that can be used for identifying parking locations. The system 200 provides the components that perform a method for populating a database identifying parking locations and later using the database to provide navigation to an available parking location. The database may include two sets of data that may be stored in two databases including a raw data collection database 208 and a parking location database 210. The two databases 208 and 210 can effectively exist as two independent databases and/or a single database. Generally, the raw data collection database 208 is a collection of indirect data received from devices 216a-n that may require analysis to confirm that a geographical area is a parking location. This indirect data may be provided by vehicles 106 or devices 216a-n that have provided some form of electronic consent to provide the indirect data and may be provided without any explicit action on the part of the users of the vehicles or devices. The indirect data may represent a current location of a particular device and a current speed of the particular device. The location may be determined by the vehicle 106 or device 216 using Global Positioning System (GPS) hardware and/or other hardware. Thus, a user may provide some form of electronic agreement to anonymously provide the current location of the vehicle or particular device and the current speed of the vehicle or particular device. Direct data may explicitly be provided, such as through a user interface in the vehicle or through an app on mobile device linked to the vehicle, by the users of the vehicle 106 or devices 216a-n. Users may volunteer to explicitly provide the direct data and/or may provide the direct data in response to a request to provide the direct data. Such a request may be sent to a device 216 that is believed to be associated with a vehicle 106 that has parked and may have exited the vehicle with a user. If a user does not agree to anonymously provide the current location of the vehicle or particular device and the current speed of the vehicle or particular device, the request may be sent to obtain the current location of the vehicle or particular device and the current speed of the vehicle or particular device. Additional information regarding the particular location may be requested that may provide additional information about a related parking spot at the location.

The parking location database 210 can be a repository of parking locations that have been identified and can store realtime information that indicates whether each parking location is currently occupied or not occupied. The actual parking locations identified may be determined based on the indirect data or direct data. In addition, parking location database 210 can be used to collect, classify, and manage parking locations. Parking location database 210 can be part of a larger management system 202 that communicates via a network 218, 220 with devices 216a-216n, the vehicle 106. The parking location database 210 may be connected to an interface (e.g., location interface 206 and network interface 214). The management system 202 may contain a collection of programs, modules, subsystems, memory, and the like that facilitate data storage, modification, and extraction of parking information in the parking location database 210. The management system 202 may be implemented in a large computing environment running on a server, a personal computer, a collection of personal computers, and/or other hardware computing units. The management system 202 can include a data management system 204, with access to the raw data collection database 208, and that can analyze and otherwise process the raw data in order to determine areas that can be considered parking locations. Additionally or alternatively, the management system 202 can be implemented in a networked computing device and/or other environment.

The parking location database 210, which is in communication with the management system 202, can include an organized collection of data that can be queried that is classified into tables, reports, objects, charts, etc. The data collected will arrive via various media, the network 218 and devices 216a-216n at a raw data collection database 208 which, when processed, will help populate the parking location database 210. In the case of direct data, a graphical user interface, which may be provided through an application, a web portal or otherwise, may provide a mechanism where a user may enter geographic data for a parking location or otherwise select when in a location that is a parking location, and may provide attributes associated with the parking location, such as through a drop down menu or other interface. Such direct data may populate the parking location database 210. Such direct data may also populate the raw data collection database 208. In the case of indirect data, a graphical user interface may be used to populate information about a geographical area. However, the geographical information may not yet be determined with certainty to be a parking location. In this instance, the indirect data may populate the raw data collection database 208 which may require some form of verification or the like, before being stored in the parking location database 210.

The devices 216a-216n may include various components and/or systems that are wired and/or wireless. For example, the direct and/or indirect data can be obtained from devices 216a-216n including, but not limited to wearables, tablets, mobile phones, access points (APs), vehicles, and the like. The data transmitted by devices 216a-216n can initially be used to obtain a survey of parking locations available within a geographical area. The survey can include a collection of quantitative information about the geographical area. For example, the information received from the device 216 can include indirect data that may be represented as a data point in a heat map or represented in another way. As more information (indirect data) is gathered about the same geographical area, the heat map can be evaluated so that eventually the geographical area is considered a parking location. This information is received and stored at the raw data collection database 208. The raw data collection database 208 communicates with the data management system 204 and parking location database 210 regarding the information received.

As the data is received at the raw data collection database 208 via location interface 206, the data will be stored and accessible by the data management system 204 to evaluate the data to determine whether a particular location is a parking location. In some instances, the information received at the raw data collection database 208 may be direct data which may not require processing or minimal processing by the data management system 204. In other instances, the information received at the raw data collection database 208, may be indirect data which may involve further processing. The processing can include the use of heat mapping, statistical processes and comparison of the data distribution to a pre-existing threshold for confirmation that the location is a parking location. As an example, the threshold may be that the location may not be identified as a parking location until a particular number of unique users and/or devices 216 identify the location as representing the parking location and may be identified as being occupied or unoccupied until the particular number of unique users identify the parking location as being occupied or unoccupied. The particular number of unique users may be one user or another number of users. Heat mapping is a two dimensional representation of data that can be used to immediately obtain a visual summary of the data. Heat mapping uses colors or another representation to communicate relationships between data values instead of numbers as on a spreadsheet or graph. Statistical processes include the use of statistics to study a collection of data and interpret the data. The data can be analyzed using graphical and quantitative measures that indicate variations observed. For example, the data can be plotted on a graph and analyzed for its distribution over a statistical curve. An example of this is described below in conjunction with FIG. 5.

In addition to the receipt of both the direct and indirect data regarding the classification of a geographical area as a parking location, attributes associated with the geographical area are also received and added to the classification of that particular location (e.g., operation 308 in method 300). For example, a user can indicate, using an application on a mobile phone that communicates with the data management system 204 (via crowdsourcing), that a parking location has been found and that the user is now parked in a parking spot on Elm Street. In such an instance, the mobile device may be equipped with GPS hardware, and upon selection in the application, location data is uploaded to the raw data collection database 208. Such data, in this case, is considered direct parking data, as the location is associated with a known parking location, although this may require verification. The information transferred to the raw data collection database 208 may then be analyzed and categorized by the data management system 204 as an identified parking location.

In addition, the data management system 204 can also be used to determine what is not a parking location and when a parking location is occupied (e.g., can identify when a vehicle via predictive analysis is in a momentary traffic stop (indirect data) and not in an actual long term parking location). As indicated above, the indirect data can provide a source of information that can be added to a heat map or chart for evaluation of possible parking locations in the area. As more parking mapping information is obtained from users, devices, garage management systems, localization mapping data, etc., a more accurate parking map of the area may be created from the mesh of information enabling an application 224 to present available parking locations to the vehicle 106. The parking map can be based on the collection of information (including both direct and indirect data) that provides an indication of the available parking locations in a place of interest. In addition, the application 224 can provide live updates and attributes, as the updates are received at the raw data collection database 208 and/or the parking location database 210. For example, the application 224 can point not only to a parking location, but also include details regarding the parking location's availability. For instance, the application 224 can provide details such as, the parking location is a residential parking location and it is open to the public from 8 am to 5 pm but not on Tuesdays for street sweeping. Further details regarding populating the parking location database 210 are described below and in conjunction with FIGS. 4-5. Details regarding the method for populating parking location database 210 are found below and in conjunction with FIG. 3.

In one example, the vehicle 106 may traverse a parking lot, along a particular street, or another location having associated parking locations and determine that some of the parking locations are occupied and some of the parking locations are not occupied. The vehicle 106 may send information about the parking locations to the data management system 204 that is stored in the raw data collection database 208 and/or the parking location database 210. This information may be a current location of the vehicle 106, a current location of the device 216 that may be different than the location of the vehicle, an image of the parking location that may show a vehicle in the parking location, and other information. In another example, the vehicle 106 may park in a parking location and a user may take their device 216 with them when exiting the vehicle. At a particular distance and/or after a particular period of time, the device 216 may determine that it is no longer in communication with the vehicle 106. The wired or wireless connection between the vehicle and the device may be disconnected. The vehicle 106 and/or the device 216 may send a notification that indicates that the parking location is occupied to the data management system 204 that is stored in the raw data collection database 208 and/or the parking location database 210. When the user returns to the vehicle 106 and the device 216 is located in the vehicle and the vehicle travels the particular distance from the parking location, the device and/or the vehicle 106 may send a notification that indicates that the parking location is unoccupied to the data management system 204 that is stored in the raw data collection database 208 and/or the parking location database 210. When the device 216 enters the vehicle, the wired or wireless connection that was previously disconnected is reestablished. Users may have the opportunity to explicitly or automatically add information about a new parking location and/or edit information about known parking locations using the vehicle 106 and/or the device 216. In one particular example, a user may offer a parking location that may be located on their private property, such as a parking location in a driveway, a parking lot, or a parking garage and may indicate times that the parking location may be available for use. In this case, the user may explicitly send direct data that represents a parking location on private property from a device 216 having a user that agrees to explicitly submit the direct data.

An application executed by the device 216 or the application 224 of the vehicle 106 may display a user interface that allows the user to offer the parking location that may be located on their private property. As an example, the user may provide information associated with the parking location including physical location, hours of availability each day, and pricing information. The device 216 or the vehicle 106 may send this information to the data management system 204 via the network 220 or network 218 and the data management system may store the information in the parking location database 210.

As indicated above, as the parking location database 210 stores additional information and becomes more comprehensive the application 224 executed by a processor of the computer system 222 in the vehicle 106 can be used to present a device with available parking locations. For example, the application 224 in vehicle 106, can present a GUI using the display 226 that provides a route to an open parking location. The route can be computed by the navigation module 212 located in the management system 202. Additionally or alternatively, the route can be computed by the vehicle 106 using the computing system 222. Still as another example, as a first parking location becomes occupied, the application 224 can update the display 226 with an alternate place to park. The update on the application 224 can occur when realtime information from any of the devices 216a-216n arrives at the raw data collection database 208 and/or directly at the data management system 204 via the location interface 206. The data management system 204 sends the realtime information to the vehicle 106 to update the application 224. The network interface 228 of the vehicle can communicate with the management system 202 via the network 220 for real-time updates. The vehicle 106 can include the processor of the computer system 222 and memory 230 that may store and present the vehicle 106 with alternate routes to park the vehicle 106 and/or alternate parking locations. The operations encountered in presenting the user with a parking location and its attributes are discussed below and in conjunction with the process shown in FIG. 7.

Figure 3:
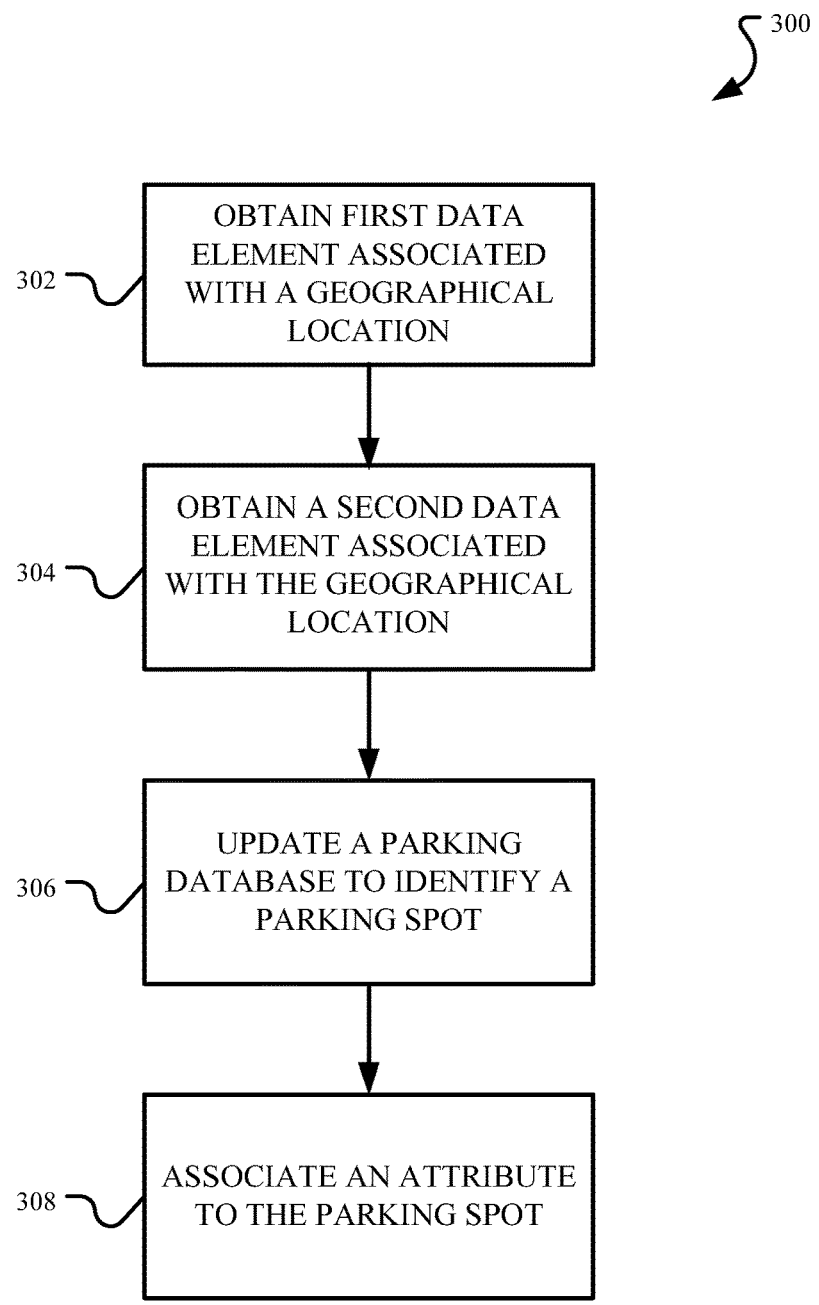
FIG. 3 is flowchart of a process for populating parking locations in a data management system.

FIG. 3 is a flowchart of a process 300 for populating parking locations in the parking location database 210. Taking inventory of a large location (like a city) and identifying all parking locations can be a very complex task. Large quantities of data have to be gathered, managed, and processed. The processing, managing, and gathering can be performed by hardware and software modules similar to those in the management system 202 of FIG. 2. The data can be received at the raw data collection database 208 and stored, after being processed by the data management system 204, in the parking location database 210 shown in FIG. 2 and as illustrated in process 300.

The data to populate the raw data collection database 208 can be gathered from individuals, devices, institutions, wearables, vehicles, and other computing devices. A first data element may be obtained in operation 302 which first identifies a geographical location which can be considered a parking location. In some instances, identifying parking locations can take minimal to no processing (e.g., direct data/information), but in other instances, identifying the parking locations may be more computationally intensive (e.g., indirect data/information). In some instances, the data can be concrete while in other instances the data may have to be analyzed to confirm that a particular location is a parking location. Therefore, in some instances the process of identifying a parking location may be simpler and based on the two data elements as obtained in operations 302 and 304.

In operation 302, the first data element is obtained at the raw data location database 208. The raw data is then transmitted to the data management system 204, where the raw data is processed to determine if the information or data element received can be identified as a parking location. Process 300 then continues at operation 304 where a second data element is received at the raw data location database 208 and again processed by the data management system 204. In this instance the two data elements received by the various sources may be sufficient to confirm that a geographical location is a parking location. In other instances, operations 302 and 304 may be insufficient and require repeating if the parking information received is indirect information. Additional data elements may be obtained from users and/or devices 216 until sufficient confidence exists that the particular location is associated with a parking location.

For example, if the first data element received is parking information from locations that already have pre-existing parking locations accounted for, then the data element received is verified (direct data) and may require little to no analysis. The pre-existing parking locations that have parking spots accounted for can include parking garages, cities with sensors, areas that have locations that have already been localized, etc. Cities and parking garages with compatible infrastructures can be associated with the management system 202 and report parking spots and availability to be processed by the data management system 204. Once the data management system 204 confirms that the data elements received regarding the particular geographical location points to a parking location, then the process 300 moves to operation 306.

Figure 4:
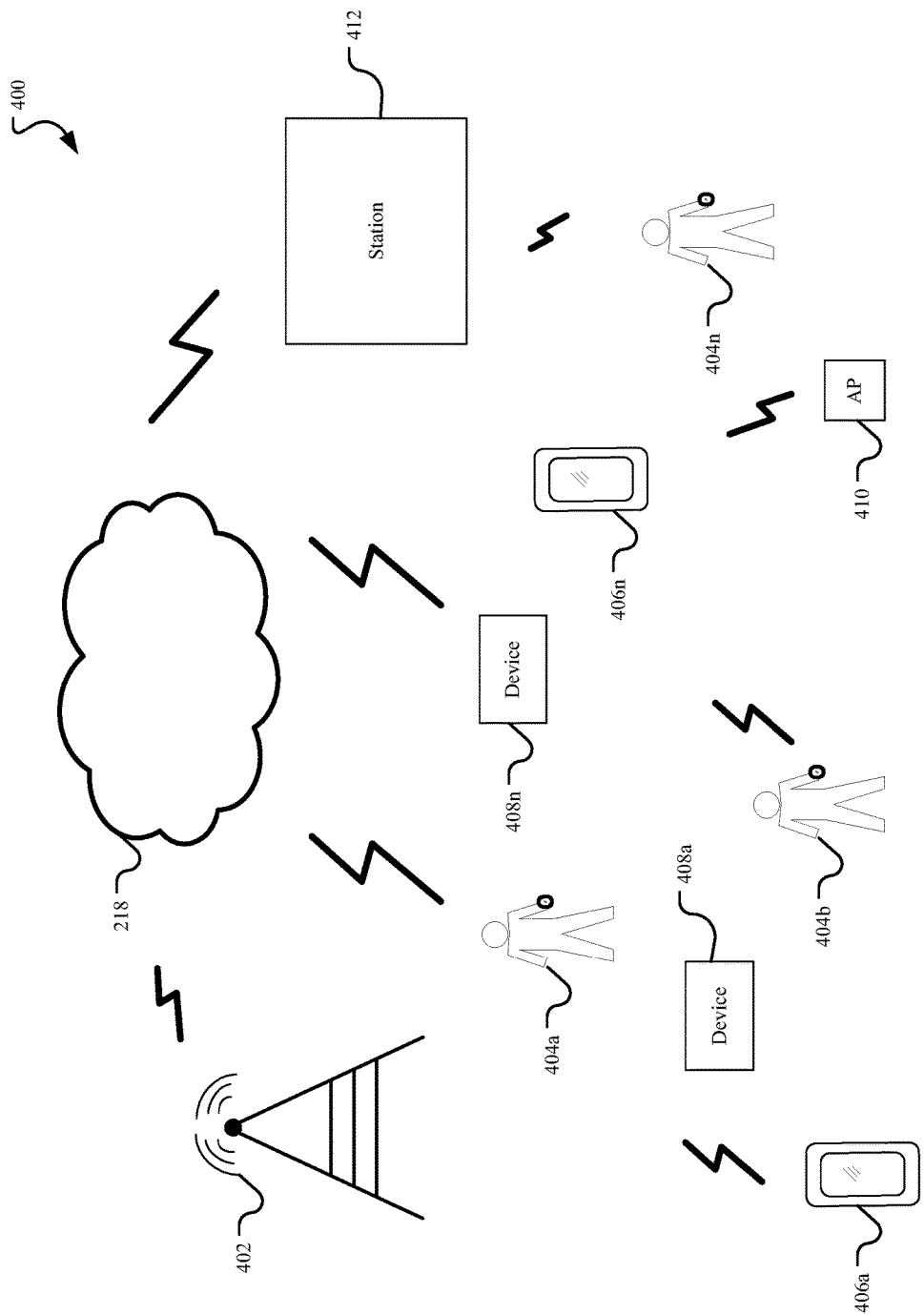
FIG. 4 is a diagram illustrating crowdsourcing for obtaining parking location information.

Alternatively, device users can update a registry/database/application as a location is reached and determined to be a parking location. This update can require some analysis to confirm that the parking information obtained is associated with a parking location. For example, the first data element obtained can arrive from an application, e.g., the application 224, where other users have provided feedback via crowdsourcing. The use of crowdsourcing has become a popular method for obtaining large data sets rapidly. Crowdsourcing can be used by placing an open call for participants and/or crowds to provide feedback regarding a specific problem that needs to be solved. The concept of crowdsourcing enables problem distribution. By distributing a problem, large amounts of information can be obtained by soliciting others to contribute. FIG. 4 below provides more details regarding the crowdsourcing process.

As another example, the information received as the first data element in operation 302 can be derived from a wireless device, a wearable device, or a vehicle, among other sources. Sensors could be leveraged for scanning parking spaces as the areas are passed. For instance, other vehicles having sensors may collect information regarding available parking locations and transmit the information to the data management system 204 for storage in the raw data collection database 208 and/or the parking location database 210. Probabilistic analysis based on user/device actions could also be used to identify parking locations. For instance, the vehicle 106 can consider events occurring within the vehicle 106 to predict with a certain probability (e.g., probability above a threshold) that it is now located in a parking location. In other words, the vehicle stops, an engine stops, a motor stops, an entertainment system (music/video) stops playing, the door closes, and the vehicle is stationary for an extended period of time. A prediction can be made that vehicle 106 is parked. This prediction can be sent to and stored in the parking location database 210.

Predictive analysis based on an arrival time could also be used to identify parking locations and/or available parking locations. Predictive analysis uses machine learning and data mining to analyze current data and historical data to make predictions about future or unknown events. For instance, the vehicle 106 can consider a location of interest and an approximate time of arrival to predict where it is most likely that an unoccupied parking location may be at the time of arrival. Predictive analysis for locating available parking locations can leverage the use of realtime and historical data in the parking location database 210.

In some instances, where the information obtained needs analysis (e.g., indirect data is received), the data may need to be analyzed to determine with certainty that the first, second, third, etc., data elements associated with the geographical location indicate that the specific location is a parking location. To analyze the data, statistical analysis can be performed including, but not limited to the use of heat mapping, statistical distributions, time series analysis, regression analysis, mean square deviation, etc. An overall goal may include determining with great certainty, having built enough evidence, that a parking location has been identified and confirmed. As more and more data is obtained, the more confident the analytics can prove (e.g., by peaking and/or by meeting a threshold) that a parking location has been located. Further, details regarding the use of statistical analysis are included below and described in conjunction with FIG. 5.

As the statistical analysis provides confident determinations that parking locations have been identified the process continues to operation 306 where the parking location database 210 is populated and information may be stored in the parking location database 210. As an example, once a particular number of users, vehicles, and/or devices have submitted data elements that the parking location represents a parking location for a particular period of time, then it can be confirmed that a particular parking location exists. As an example, each specific location may not be deemed to be a parking location until at least x unique users, vehicles 106, and/or devices 216 have provided data elements associated with the specific location for y time period. Based on the information in the parking location database 210, it may be confirmed that there is a parking location at the geographic location. This threshold may be used to determine that a parking location may have been a parking location and is no longer a parking location or that a particular parking location is temporarily unavailable for whatever reason. In addition, each specific location may be deemed to be occupied or unoccupied based on the information from the x unique users, vehicles 106, and/or devices that have provided the data elements.

The data management system 204 may receive indirect data from a vehicle 106 or a device 216 having a user that agrees to automatically submit the indirect data. This may not require any explicit action by the user. The indirect data may represent the first data element and the second data element. This indirect data may be stored in the raw data collection database 208 and/or the parking location database 210. Alternatively, the data management system 204 may receive direct data from a vehicle 106 or device 216 having a user that agrees to explicitly submit the direct data. The direct data may represent the first data element and the second data element. This direct data may be stored in the raw data collection database 208 and/or the parking location database 210.

The data management system 204 may send a request to a vehicle 106 or a device 216 that requests that a user submit direct data representing the first data element and the second data element. In another example, the data management system 204 may receive anonymous indirect data from a vehicle 106 or a device 216 having a user that agrees to anonymously automatically submit the indirect data. The indirect data may represent the first data element and the second data element.

Alternatively, the data management system 204 may receive anonymous direct data from a vehicle 106 or a device 216 having a user that agrees to anonymously submit the direct data in response to user input, the direct data representing the first data element and the second data element. In some instances, the data management system 204 may receive the indirect data from the device 216 after a particular period of time when the device travels a particular distance from the geographic location. As an example, when a user parks their vehicle 106, they may exit the vehicle and take their device 216 with them. When the user is located approximately 100 meters from where the vehicle is parked and/or five minutes after the vehicle was parked, the device 216 may display a notification that requests that the user anonymously submit direct data about where the vehicle was parked, e.g., the location and other information including information obtained from sensors of the vehicle 106 and/or the device 216. If the user agrees to submit the direct data, the vehicle 106 and/or the device 216 may transmit the direct data to the data management system and the data management system may store the direct data in the parking location database 210.

In another instance, the data management system 204 may receive the indirect data from the device 216 after a particular period of time when the device travels a particular distance from the geographic location and is unable to communicate with a vehicle that is parked at the geographic location. The device 216 and the vehicle 106 may communicate via a wired network or a wireless network such as via Bluetooth, WiFi, or using another type of network. This may allow the data management system 204 to determine that the vehicle that is parked at the geographic location is occupying the parking location and may allow the vehicle to determine whether the device 216 is located within the vehicle. The vehicle 106 determines that the device 216 enters and exits the vehicle based on a connection established via the network. As an example, when a user parks their vehicle 106, they may exit the vehicle and take their device 216 with them. When the user is located approximately 100 meters from where the vehicle is parked and/or there is not a network connection between the vehicle 106 and the device 216, the device 216 may display a notification that requests that the user anonymously submit indirect data about where the vehicle was parked, e.g., the location and other information including information obtained from sensors of the vehicle 106 and/or the device 216. If the user agrees to submit the indirect data, the vehicle 106 and/or the device 216 may transmit the direct data to the data management system and the data management system may store the direct data in the raw data collection database 208. When the device 216 returns to the vehicle, the data management system 204 may determine that the device 216 is in communication with the vehicle when a network connection is reestablished.

The vehicle 106 or the device 216 may travel with the vehicle a particular distance from the parking location and then the data management system 204 may determine that the vehicle 106 is no longer occupying the parking location. The vehicle 106 and/or the device 216 sends location information of the vehicle including GPS information or information obtained from sensors of the vehicle 106 and/or the device 216 such as elevation information. The data management system 204 determines that the vehicle 106 is parked in the parking location. When the vehicle is no longer occupying the parking location, the vehicle 106 and/or the device 216 sends information to the data management system 204 for storage in the parking location database 210. As an example, the vehicle 106 and/or the device 216 may send a current location of the vehicle to the data management system that is different from the parking location in addition to other information associated with the vehicle including whether the engine or motor is running, an entertainment system is operating, and a door opens, among other things, alone or in combination, that may provide information about the parking location.

As indicated above, the parking location database 210 can be a database that stores parking information about geographical locations that are identified as parking locations. Additional information gathered from the sources is also received and stored in the parking location database 210 which can correspond to attributes associated with the parking locations. The attributes may be stored in the parking location database in operation 308. For example, times when the parking location is available may be associated with the parking location. As another example, the type of parking location (e.g., handicap, loading/unloading, etc.) can be identified and associated with a specific parking location.

As the association continues and data analysis proceeds, a set of rules associating the parking location with its attributes can be established. The rules can be used to quickly retrieve available parking locations that could be presented to the vehicle via the application 224 on the display 226 as indicated above in system 200.

The process of updating the information in the parking location database 210 will continue, as the parking location availability is constantly changing. As parking locations become available or occupied, the database will be continually updated. Realtime information from vehicles 106, devices 216, users, sensors, and other devices and/or structures indicating information associated with whether a parking location is occupied and not occupied may be stored in the parking location database 210. FIG. 6 provides an exemplary database table of the parking location database 210 that can be used by the system 200. The database table can include location details such as the coordinates associated with a parking location. The database table can also include details regarding the availability of the parking location as information is received. The details can become attributes that are associated with the particular parking location as indicated in operation 308.

As indicated above, identifying parking locations may be based on the ability to gather sufficient information to make positive predictions. The information is received at the raw data location database 208, from the various devices 216*a*-216*n* and/or individuals. One such method available for gathering big data is the use of crowdsourcing. FIG. 4 is a diagram illustrating crowdsourcing 400 to obtain parking location information. Crowdsourcing 400 is a process used to obtain information and/or services from a variety of sources. The process uses "crowds" of people, institutions, devices, electronics, etc., to collect information via contributions made by multiple sources. The information collected is often explicitly provided by an individual's own initiative. However, the information can also be collected automatically and often anonymously by a device as noted above.

In using crowdsourcing 400, individuals can participate in the process with the use of a device. For example, user 404a can provide data either explicitly or automatically regarding a parking location using his/her smartphone. For instance, the posted data can include information that indicates that a parking spot was available at the University Parking Lot for $5.00/hour at 3:45 pm. Other smartphone users 404b-n can similarly provide information regarding parking locations found, parking lots that were full, time of day, prices, and other relevant information. The information from users 404a-404n, is not limited to information from smartphones 406a-406n, and can include information from other devices such as portable tablets, pads, laptops, watches, wearables, etc. The information can be sent via the network 218 to network storage, a remote server, a cyber-physical system, and/or another similar management system.

An individual participating in crowdsourcing can participate with a device which can incorporate a system that can include hardware and/or software that prevents or blocks access to the individual participant's personal data. For example, the system can allow users to "opt in" or "opt out" of participation in the collection of personal data or portions thereof. Also, individuals can select not to provide location information, or permit provision of general location information (e.g., a geographic region or zone), but not precise location information.

In some instances, the wireless devices 406a-406n can automatically transmit details regarding what may be considered a parking location. For example, a user 404 in a vehicle 106 stops the vehicle 106 or the user 404 is traveling at a slower rate. As another example, the vehicle 106 makes a maneuver that indicates that the vehicle is parking, such as maneuvers required for parallel or perpendicular parking. The wireless device 406a-406n can use these actions and perform probabilistic analysis to identify a possible parking scenario and send the information to the management system 202 with the crowdsourcing request. As another example, the device 406a-406n can provide information based on the actions occurring at the device 408. That is to say, in the previous example, the wireless device 406 performs probabilistic analysis based on the motions of the user or the vehicle. In this instance, the predictive analysis can be based on the actions on the device 408. For example, the device 408 can be the vehicle 106 which is performing the probabilistic analysis as it is driving, parking (stopping for longer than a standard light stop), and recognizing that a door closes. The vehicle 106 can use probabilistic analysis to determine the vehicle 106 has been parked and send the parking details to the management system 202. The probabilistic analysis can be performed by the vehicle 106, the device 216, the data management system 204, and/or another server as data is gathered by the wireless devices 406 that satisfied pre-determined conditions. As an example, a number of the wireless devices provide information about a particular parking location for a particular period of time. That may allow the data management system 204 to confirm that there is a confirmed particular parking location.

Additionally or alternatively, image analysis can be used. For example, a camera can be mounted on the vehicle 106 and used to determine that the vehicle has been parked and determine information about parking locations in view of the vehicle 106. If the vehicle stops in a known parking location, information that the parking location is now occupied is automatically transmitted to the management system 202.

Other devices can similarly transmit similar details. For example, some parking locations or facilities (e.g., SFPark) may already be associated with a system that identifies parking locations and their availability. These systems and/or devices (e.g., access point (AP) 410 and station 412) can automatically upload the information. Cellular communications 402 as well as the use of other networks can be used for crowdsourcing 400 parking information and/or simply transmitting the parking information to the management system 202.

Figure 5:
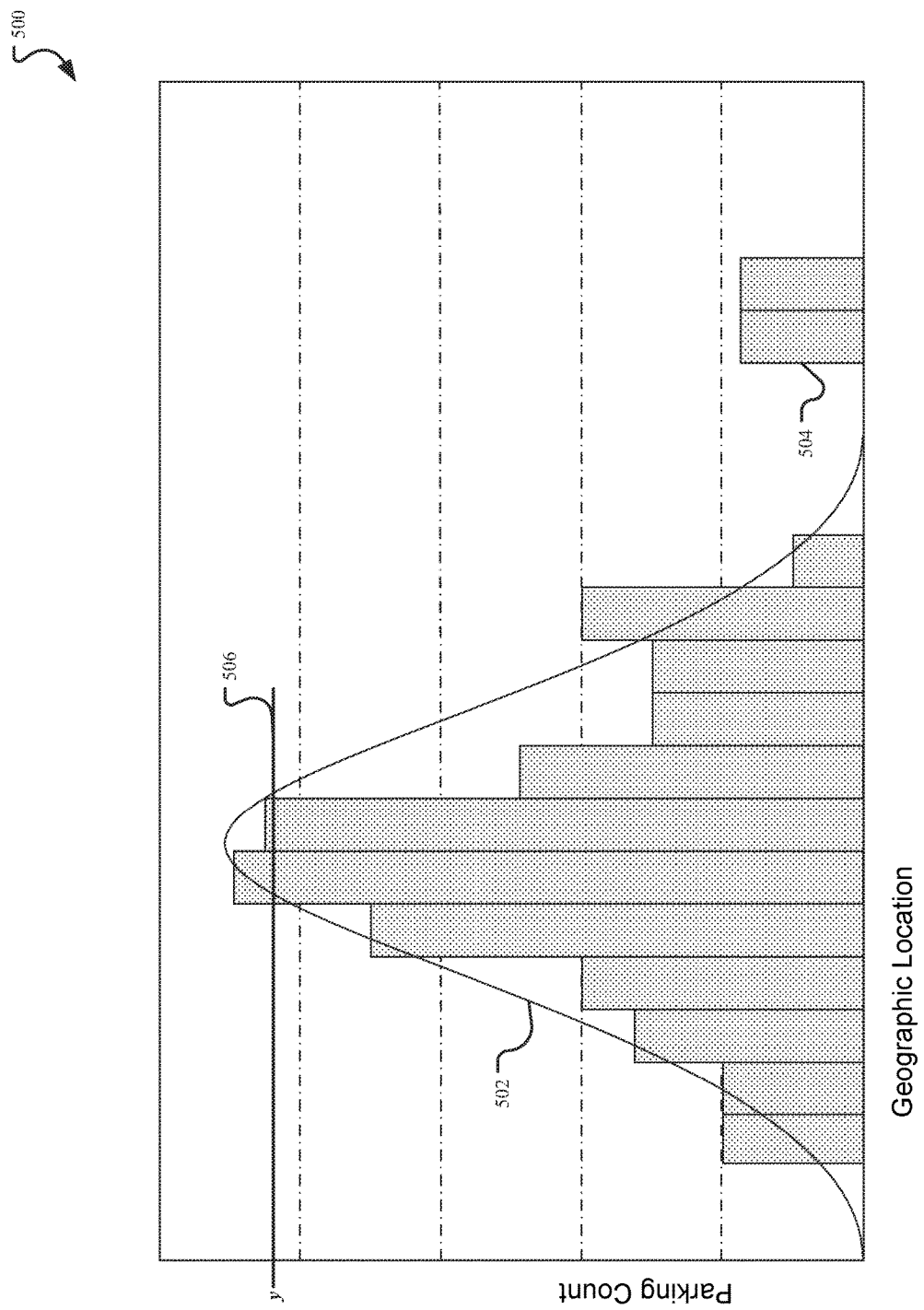
FIG. 5 is a diagram illustrating a normal distribution of parking data collected for identifying parking locations.

As information is uploaded to the management system 202, information storage, management, and processing is taking place. A first step in processing all the data arriving from the various sources includes associating the information with a geographical location as indicated above and in conjunction with FIG. 3. Oftentimes, in processing data, statistical representation of the data can be used to analyze the information more efficiently. FIG. 5 provides an illustration of such statistical distribution.

Statistical analysis is widely known for analyzing large amounts of data for discovering patterns and trends that may be underlying the processed data. The data can be analyzed, interpolated and organized using statistics, and this processing can occur in the data management system 204 of system 200. Therefore, the information arriving at the raw data location database 208 is transferred to the data management system 204 for analysis. An example of a statistical distribution is a normal distribution 500 as illustrated in FIG. 5, which can be used to determine with certainty that the coordinates received regarding the geographical area correspond to an actual parking location. For example, a first data element (operation 302) is received indicating that a vehicle parked at the corner of Elm Street and Smith Street. A second data element is received (operation 304) indicating that another vehicle parks at the same location and the information is stored in the raw data collection database 208. As more and more details are received about the location at the corner of Elm Street and Smith Street, the more evident it may become that a parking location is located at the corner of Elm Street and Smith Street.

The repetitions create a peak in the distribution that illustrates and associates that specific geographical location with a parking location. The sharper the peak, the greater the confidence. In some instances, a threshold y 506 can be used to determine that indeed a peak was achieved and the database (the parking location database 210) can be updated to associate the geographic location with a parking location. The normal distribution 500 exemplified in FIG. 5 provides a general illustration of how information received regarding parking locations can be distributed. The information is centered about the middle of the curve and any outliers 504 are not really accounted for. Although a normal distribution 500 is used, the statistical analysis performed on the data received can take place in the data management system 204, using the Chi-Square Test, Rayleigh Distribution, Time Series Analysis, Regression Analysis, Heat Mapping, Mean Square Deviation, Regression Analysis, etc. The goal is to provide an accurate mapping of a geographical location so that all possible parking locations are identified in operation 306 of FIG. 3.

A similar approach can also be used in analyzing the parking data for operation 308 as well. Operation 308 of FIG. 3 corresponds to receiving attributes associated with a geographical location. As indicated above, attributes can include details regarding the geographical location. A geographical location may be confirmed to be a parking location in operation 306. For example, the attributes can include costs associated with parking at that particular parking location, costs to park based on date and time, closures for street sweeping or events, covered and uncovered, etc.

As the data is received at the management system 202, it can be stored for processing, analyzing, and updating. For proper storage, it is generally important that the storage system has the ability to rapidly process the data and can provide the appropriate input/output operations per second (IOPS). In general, servers, data structures, networked computing devices, and hyperscale computing environments, among others, are types of systems used for processing the type of data. A database table 600 in FIG. 6 provides an exemplary embodiment of a possible parking location database 210 that can be used to store the various parking location parameters received from users and/or computing devices. The users and/or computing devices can include individuals, institutions, organizations, devices, wearables, vehicles, etc. The data collected can include elements, much like those discussed in conjunction with FIGS. 2 and 4 describing a parking location.

For example, a first column in the database table 600 may store a first attribute related to the coordinates 602 associated with the parking location can be stored. The coordinates 602 can be an important attribute in the database table 600. The importance of the coordinates attribute 602 stems from the ability to locate the parking location using the coordinates. Also, the coordinates can be used to route a person to the corresponding coordinates 602 associated with the parking location available. Coordinates 602 can, for example, be associated with the first data element received regarding a geographical location as described in FIG. 3.

Statistical analysis associated with the threshold may be used to determine that the coordinates 602 associated with a first location 612 correspond to a parking location. Additional attributes providing information associated with the parking location can be stored in the database table 600. In one instance, the availability of a parking location can be stored in another column in the database table 600 that stores the corresponding availability attribute 604. For example, through crowdsourcing 400, analytics may confirm that parking location 1 612 is only available for public use from 8 am-5 pm. This time of availability can be stored in in the column associated with the location availability attribute 604. Similarly, the cost associated with a specific parking location can also be obtained and stored in another column in the database table 600 associated with the cost attribute 606. For example, this can include the cost of $8.00/hour parking at the particular location. It can also be possible that the cost of parking at the specific location can vary. This type of detail can also be stored in the parking location database 210. In addition, these details can be used to tailor the parking locations available and presented to a user 404. The attributes can be used as indicated based on reliability factors and/or specified user preference. Reliability factors can include user supplied parking availability vs. data provided by a garage's tracking system. User specified preferences can include an indication that only covered parking is desired, that parking costs under a given amount, and parking is under a certain distance from the desired location, among others. For example, a user can indicate the desire of a parking location within the proximity of a location of interest that is under $5/hour and is covered parking. These details can help tailor the parking locations that are presented to the user 404.

Another attribute associated with an identified parking location can be stored in another column of the database table. The attribute stored in the column may be associated with a vehicle type attribute 608. This information may indicate the vehicle type parking available. The parking location for example, can be designated handicap, motorcycle, compact, etc., and stored in the vehicle type attribute 608 column of the database table 600. This attribute can be used in routing the vehicle 106 to a parking location using the application 224 from the system 200. For example, a driver of a pickup truck can be presented with available parking locations that exclude compact parking locations. Additional attributes 612 can be stored in other columns of the database table 600 and can include information associated with covered/uncovered parking, long-term or short-term parking (time constraint attribute 610), distance to locations of interest, etc.

Further, as parking location information is received by the management system 202, and statistical analyses are performed, attributes in the parking location database may have to be updated. For example, realtime information may show that a parking location is open until 5 pm as opposed to 6 pm for summer hours. This update can be stored in the parking location database 210 can be used when identifying available parking locations. Similarly, if a vehicle leaves a parking location, the update can be stored in the parking location database 210. An associated row in the parking location database 210 may reflect that a previously occupied spot is an open spot.

For example, vehicle 106 can be en route to a location identified by the parking location database 210 storing information associated with the corresponding parking location 1-location n. The application 224 can request information from the parking location database 210 and present the availability of parking locations 1, 2, and 5. The application 224 could further indicate that parking location 2 is designated handicapped and thus may be eliminated by the user if not applicable. Also, the application 224 can present location 1 as available from 8 am-5 pm at $5.00/hour. Additionally or alternatively, location 5 can be indicated as available at $3.00/hour from 5 am-10 pm. However parking location 5 may be located further from the final destination at x5, y5 coordinates. The vehicle user can select to be routed to location 1 and/or 5 (and/or location 3 if applicable). An exemplary visual representation of the route and the method used to present the available parking location(s) using the parking location database 210 is described below and in conjunction with FIGS. 7-8.

Figure 7:
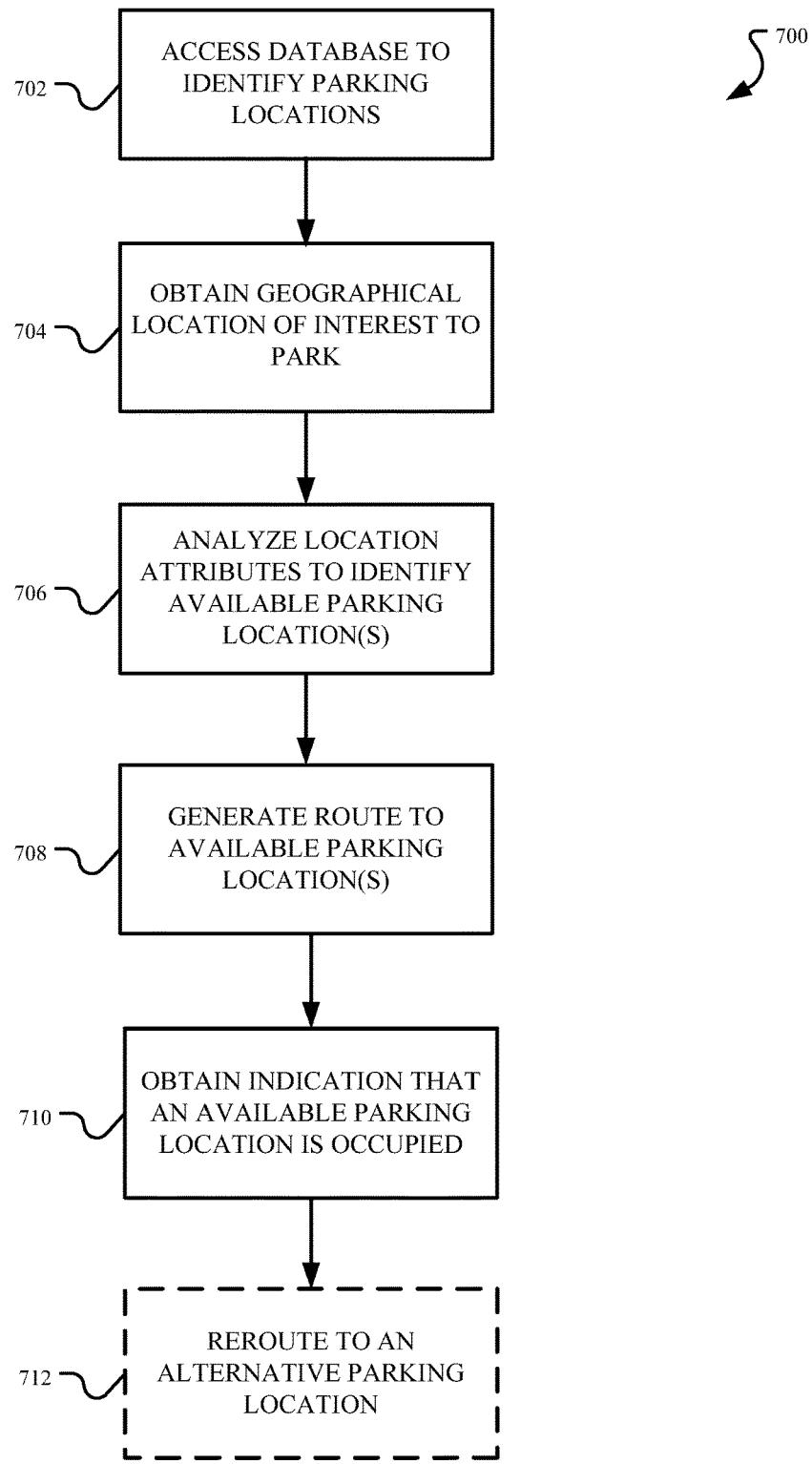
FIG. 7 is a flowchart of a process for locating and directing a user to an available parking location.

FIG. 7 is a flowchart of a process 700 for locating and directing a vehicle user to an available parking location. In a first operation 702, the application 224 requests parking location information from the parking location database 210. The application 224 communicates with the management system 202 via the network 220 as illustrated in FIG. 2.

Once the parking location database 210 has been accessed in operation 702, the process continues to operation 704 where vehicle user or the vehicle 106 provides the geographical location of interest or final destination (like in street location 104 of FIG. 1). This geographical location of interest will provide the application 224 with information so that the data management system 204 can identify, using at least the coordinates attribute 602 and availability attribute 604, available parking locations. In operation 706, the data management system identifies the available parking locations using the information in the parking location database 210. The available parking locations can be identified by the data management system 204 using the corresponding attributes of the parking location. Alternatively, the available parking locations can be predicted using the location of interest and approximate time of arrival and/or available parking locations can be identified by communicating with other devices 216 and vehicles 106 that have located available parking locations.

As the available parking locations are identified in operation 706, routes to the desired available parking locations can be generated and provided in operation 708. The routes can include multiple ways to arrive at one of the desired parking locations. The routes can also include multiple ways to arrive at various available parking locations in the vicinity of the geographical location of interest. Further, the routes can be provided visually or audibly in list form and/or provided visually on a map representation. The vehicle 106 and/or the vehicle user can select one of the parking locations. In addition, the identified parking locations can include details/attributes associated with the identified parking location. For example, the application 224 can present three parking locations, their distances, and any costs associated with the parking location. As described above, the parking location database 210 stores attributes that correspond with the identified parking locations. These attributes can be used by the user to filter the available parking locations and for selecting the available parking locations.

During transit to the geographical location of interest, realtime information from the users, devices, etc., can be sent to the data management system 204 and stored in the raw data collection database 208 and/or the parking location database 210. The realtime information may indicate that a new parking location has become available or alternatively that another parking location is no longer available. The realtime information may be communicated to the application 224 and transmitted to the vehicle 106 for display on the display 226. The updates associated with parking locations may be provided in operation 710. If necessary, in operation 712, the data management system may determine an alternative parking location and sent information to the vehicle 106 that re-routes the vehicle user to the alternative parking location. In some instances, updates on available parking locations can be obtained from other vehicles 106 and/or devices 216 that have located available parking locations. In other instances, available parking locations can be identified using predictive analysis based on the location of interest and arrival time.

Figure 8:
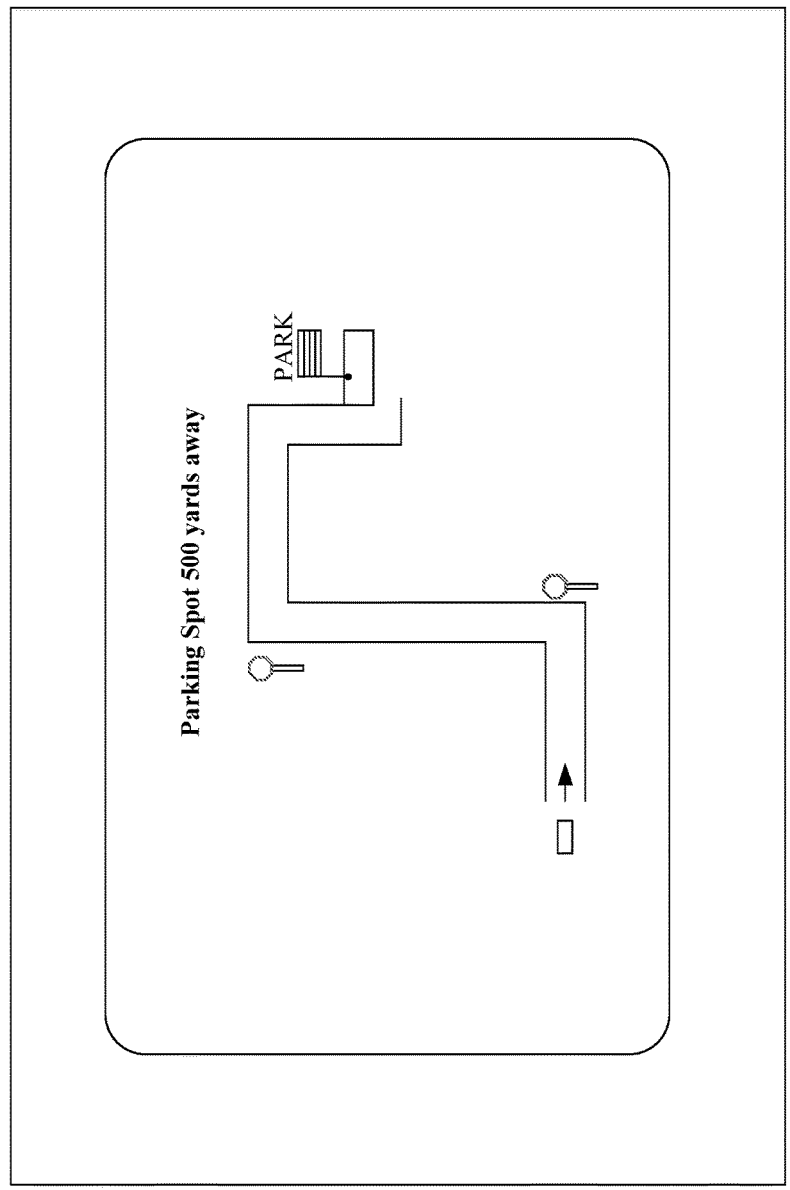
FIG. 8 is a diagram illustrating a visual representation of a route to take to an available parking location.

FIG. 8 is a diagram illustrating a visual representation 800 of graphical user interface (GUI) that may be displayed by the display 226 associated with an available parking location. In instances where one available parking location is selected, the visual representation can provide realtime turn-by-turn directions that include a route to the parking location as illustrated in FIG. 8. Additionally, the available parking location can be accompanied by a list of directions that route the vehicle 106 to the available parking location. Alternatively, the available parking location can be presented with only the listing of directions. In instances where the parking location database 210 is updated with details regarding the location the vehicle is being routed to, the visual representation can be updated and can provide information to reroute the vehicle 106 to an alternate parking location if necessary, as indicated in operation 712.

In instances where more than one available parking exists, and/or the vehicle user is interested in routing to multiple available parking locations, then the visual representation 800 can be updated to include the various routes and/or listings. In addition, the corresponding attributes regarding the identified parking locations can be presented to the vehicle user via application 224.

Process 300 has been described for creating a parking location database. Process 700 has been described for obtaining information from the parking location database and routing to a particular parking location. In addition, the use of an application for presenting available parking locations has also been described. However, in an electronic device, such as a vehicle or other wireless device used with the application, other system units may exist and be necessary for to operate the vehicle and/or wireless device.

Figure 9:
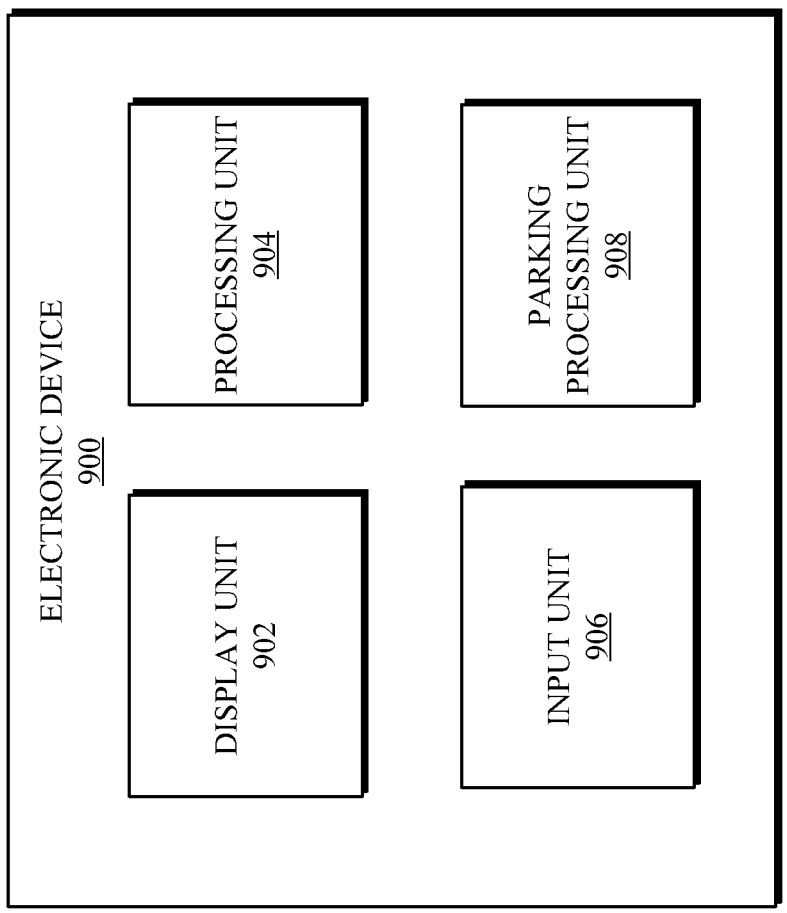
FIG. 9 illustrates a functional block diagram of an electronic device including operational units arranged to perform various operations of the presently disclosed technology.

FIG. 9 provides a description of some of the other system units involved. For example, an electronic device 900 including operational units 902-908 arranged to perform various operations of the presently disclosed technology is shown. The operational units 902-908 of the device 900 are implemented by hardware or a combination of hardware and software to carry out the principles of the present disclosure. It will be understood by persons of skill in the art that the operational units 902-908 described in FIG. 9 may be combined or separated into sub-blocks to implement the principles of the present disclosure. Therefore, the description herein supports any possible combination or separation or further definition of the operational units 902-908.

In one implementation, the electronic device 900 includes a display unit 902 configured to display information, such as a graphical user interface, and a processing unit 904 in communication with the display unit 902 and an input unit 906 configured to receive data from input devices or systems. Various operations described herein may be implemented by the processing unit 904 using data received by the input unit 906 to output information for display using the display unit 902.

Additionally, in one implementation, the electronic device 900 includes a parking processing unit 908 implementing the operations described with respect to the system 200 of FIG. 2. The instructions executed by the parking processing unit 908 can include the processes necessary to run application 224 on a wireless device and/or vehicle 106. The parking processing unit 908 can communicate with the processing unit 904 to provide a vehicle user with the parking locations and attributes acquired by the parking location database 210. The parking processing unit 908 can also include other sub-units to perform route estimation that will be presented by application 224 via display 226 for the vehicle user's information. As indicated above, numerous routing algorithms exist and can include the A* algorithm, the Dijikstra algorithm, the Bellman-Ford algorithm, etc. Additional processing sub-units can also exist within the parking processing unit 908 including digital signal processing components common in heterodyne systems including, but not limited to, components capable of processing signal modulation, transformation, interleaving, puncturing, digital-to-analog conversion, frequency up/down conversion, and slope estimation. Further, the parking processing unit 908 can communicate with at least the system I/O interface to receive information from the management system 202. In addition, units may also exist (not shown) in FIG. 2 which can be used for other operations such as a controlling unit implemented for controlling the operation of a vehicle, etc.

Figure 10:
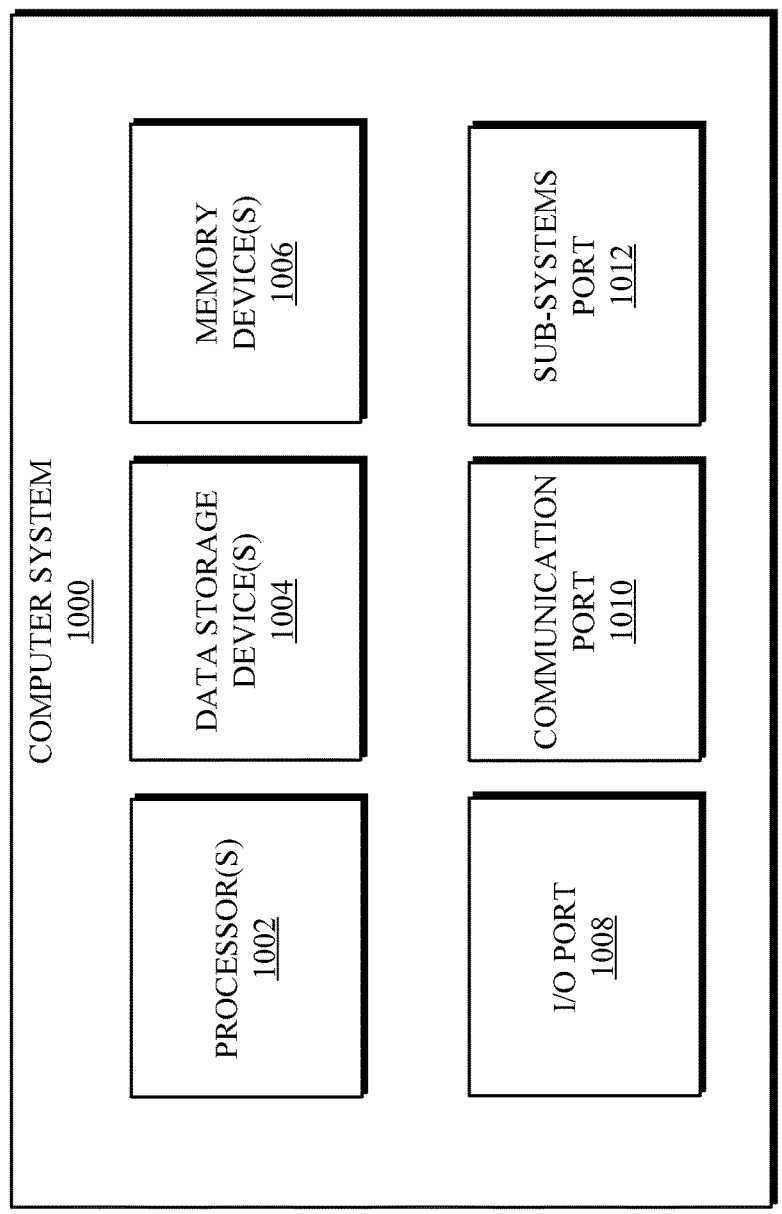
FIG. 10 is a diagram illustrating an example of a computer system which may be used in implementing embodiments of the present disclosure.

Referring to FIG. 10, a detailed description of an example computing system 1000 having computing units that may implement various systems and methods discussed herein is provided. The computing system 1000 may be applicable to the data management system 204, the computer system 222, the device 216, and other computing or network devices. It will be appreciated that specific implementations of these devices may be of differing possible specific computing architectures not all of which are specifically discussed herein but will be understood by those of ordinary skill in the art.

The computer system 1000 may be a computing system that is capable of executing a computer program product to execute a computer process. Data and program files may be input to the computer system 1000, which reads the files and executes the programs therein. Some of the elements of the computer system 1000 are shown in FIG. 10, including a hardware processor 1002, a data storage device 1004, a memory device 1006, and/or ports 1008-1012. Additionally, other elements that will be recognized by those skilled in the art may be included in the computing system 1000 but are not explicitly depicted in FIG. 10 or discussed further herein. Various elements of the computer system 1000 may communicate with one another by way of communication buses, point-to-point communication paths, or other communication means not explicitly depicted in FIG. 10.

The processor 1002 may include, for example, a central processing unit (CPU), a microprocessor, a microcontroller, a digital signal processor (DSP), and/or an internal level of cache. There may be a processor 1002, such that the processor 1002 comprises a single central-processing unit, or processing units capable of executing instructions and performing operations in parallel with each other, commonly referred to as a parallel processing environment. In addition, the processor can work jointly with the data management system 204.

The computer system 1000 may be a conventional computer, a distributed computer, or any other type of computer, such as an external computer made available via a cloud computing architecture. The presently described technology is optionally implemented in software stored on the data stored device(s) 1004, stored on the memory device(s) 1006, and/or communicated via the ports 1008-1012, thereby transforming the computer system 1000 in FIG. 10 to a special purpose machine for implementing the operations described herein. Examples of the computer system 1000 include personal computers, terminals, workstations, mobile phones, tablets, laptops, personal computers, multimedia consoles, gaming consoles, set top boxes, and the like.

The data storage device 1004 may include any non-volatile data storage device capable of storing data generated or employed within the computing system 1000, such as computer executable instructions for performing a computer process, which may include instructions of both application programs and an operating system (OS) that manages the various components of the computing system 1000. The data storage device 1004 may include, without limitation, magnetic disk drives, optical disk drives, solid state drives (SSDs), flash drives, and the like. The data storage device 1004 may include removable data storage media, non-removable data storage media, and/or external storage devices made available via a wired or wireless network architecture with such computer program products, including database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The memory device 1006 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1004 and/or the memory devices 1006, which may be referred to as machine-readable media. It will be appreciated that machine-readable media may include any tangible non-transitory medium that is capable of storing or encoding instructions to perform any of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the executable instructions or data structures.

In some implementations, the computer system 1000 includes ports, such as an input/output (I/O) port 1008, a communication port 1010, and a sub-systems port 1012, for communicating with other computing, network, or vehicle devices. It will be appreciated that the ports 1008-1012 may be combined or separate and that more or fewer ports may be included in the computer system 1000.

The I/O port 1008 may be connected to an I/O device, or other device, by which information is input to or output from the computing system 1000. Such I/O devices may include, without limitation, input devices, output devices, and/or environment transducer devices.

In one implementation, the input devices convert a human-generated signal, such as, human voice, physical movement, physical touch or pressure, and/or the like, into electrical signals as input data into the computing system 1000 via the I/O port 1008. Similarly, the output devices may convert electrical signals received from computing system 1000 via the I/O port 1008 into signals that may be sensed as output by a human, such as sound, light, and/or touch. The input device may be an alphanumeric input device, including alphanumeric and other keys for communicating information and/or command selections to the processor 1002 via the I/O port 1008. The input device may be another type of user input device including, but not limited to: direction and selection control devices, such as a mouse, a trackball, cursor direction keys, a joystick, and/or a wheel; sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1000 via the I/O port 1008. For example, an electrical signal generated within the computing system 1000 may be converted to another type of signal, and/or vice-versa. In one implementation, the environment transducer devices sense characteristics or aspects of an environment local to or remote from the computing device 1000, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1000, such as, physical movement of some object (e.g., a mechanical actuator), heating or cooling of a substance, adding a chemical substance, and/or the like.

In one implementation, a communication port 1010 is connected to a network by way of which the computer system 1000 may receive network data useful in executing the methods and systems set out herein as well as transmitting information and network configuration changes determined thereby. Stated differently, the communication port 1010 connects the computer system 1000 to communication interface devices configured to transmit and/or receive information between the computing system 1000 and other devices by way of wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. Such communication interface devices may be utilized via the communication port 1010 to communicate with other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1010 may communicate with an antenna for electromagnetic signal transmission and/or reception. In some examples, an antenna may be employed to receive GPS data to facilitate determination of a location of a machine, vehicle, or another device.

The computer system 1000 may include a sub-systems port 1012 for communicating with a system related to a vehicle to control an operation of the vehicle and/or exchange information between the computer system 1000 and a sub-system of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 10 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Note that the embodiments of the present disclosure include various operations or steps. The steps may be performed using information from hardware components, and may be embodied in hardware components or may be embodied in machine-executable instructions, which may be used to cause a general-purpose or special-purpose processor (e.g., a processing unit of the mobile device) executing the instructions to perform the steps. Alternatively, the steps may be performed by a combination of hardware, software and/or firmware.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   obtaining, using a processor, a first data element associated with a geographic location;
   obtaining, using the processor, a second data element associated with the geographic location;
   storing in a parking database, using the processor, the first data element and the second data element;

classifying, using the processor, the geographic location as a parking location using the first data element and the second data element;

generating, using the processor, a repository of one of more verified parking locations, the repository including the parking location; and determining, using the processor, whether the parking location is occupied based on the first data element and the second data element.

2. The method of claim 1, further comprising:

determining, using the processor, that the first data element indicative of the parking location at the geographic location and the second data element indicative of the parking location at the geographic location have been represented in the parking database by a number of unique computing devices; and confirming, using the processor, whether the parking location is occupied when the number is greater than a threshold.

3. The method of claim 1, further comprising obtaining attributes associated with the parking location comprising availability information, pricing information, time constraint information, and vehicle type information, storing the attributes associated with the parking location in the parking database, and transmitting information associated with the parking location including whether the parking location is occupied and the attributes associated with the parking location.

4. The method of claim 1, further comprising receiving indirect data from a computing device having a user that agrees to automatically submit the indirect data, the indirect data representing the first data element and the second data element.

5. The method of claim 4, further comprising receiving the indirect data from the computing device when the computing device travels a particular distance from the geographic location.

6. The method of claim 4, further comprising receiving the indirect data from the computing device after a particular period of time when the computing device travels a particular distance from the geographic location and is unable to communicate with a vehicle that is parked at the geographic location.

7. The method of claim 6, further comprising determining that the vehicle that is parked at the geographic location is occupying the parking location.

8. The method of claim 7, further comprising determining that the computing device is in communication with the vehicle and travels with the vehicle the particular distance from the geographic location and determining that the vehicle is no longer occupying the parking location.

9. The method of claim 1, further comprising receiving direct data from a computing device having a user that agrees to submit the direct data in response to user input, the direct data representing the first data element and the second data element.

10. The method of claim 1, further comprising sending a request to a computing device that a user submit direct data representing the first data element and the second data element.

11. The method of claim 1, further comprising receiving anonymous indirect data from a computing device having a user that agrees to anonymously automatically submit the indirect data, the indirect data representing the first data element and the second data element.

12. The method of claim 1, further comprising receiving anonymous direct data from a computing device having a user that agrees to anonymously submit the direct data in response to user input, the direct data representing the first data element and the second data element.

13. The method of claim 1, further comprising receiving direct data that represents a parking location on private property from a computing device having a user that agrees to submit the direct data representing the first data element and the second data element.

14. The method of claim 1, further comprising determining that a vehicle occupies the parking location and storing in the parking database that the parking location is occupied when one of the vehicle stops at the geographic location for a particular period of time, an engine stops, a motor is deactivated, an entertainment system is deactivated, and a door opens.

15. The method of claim 1, further comprising confirming that the parking location at the geographic location is unoccupied or occupied.

16. The method of claim 1, further comprising determining that the parking location is occupied when a computing device stops in the parking location and a vehicle determines that the computing device is located within the vehicle and exits the vehicle.

17. The method of claim 16, further comprising determining that the parking location is no longer occupied when the computing device enters the vehicle at the parking location and travels with the vehicle a distance from the parking location.

18. The method of claim 1, wherein the first data element is an image.

19. The method of claim 1, wherein the second data element is coordinate information.

20. A method comprising:

obtaining, using a processor, parking data for a geographic location within a designated geographic area, the parking data including at least one of direct data or indirect data;

classifying the geographic location as a particular parking location based on the parking data;

generating a repository of one or more verified parking locations for the designated geographic area, the one or more verified parking locations each being associated with a respective geographic location permitting parking, the one or more verified parking locations including the particular parking location;

determining an availability of the particular parking location for parking by a vehicle; and updating the repository with the availability of the particular parking location for parking.

21. The method of claim 20, wherein the geographic location is classified as the particular parking location when the parking data includes a confirmation threshold being met or exceeded, the confirmation threshold corresponding to a number of unique computing devices identifying the geographic location as a permissible location at which to park.

22. The method of claim 20, wherein the geographic location is classified as the particular parking location through at least one of heat mapping or statistical analysis of the parking data.

23. The method of claim 20, wherein each of the one or more verified parking locations are each further associated with one or more parking attributes.

24. The method of claim 20, further comprising:

outputting the repository as a parking map for the designated geographic area, the parking map including a visual representation of the one or more verified parking locations and the availability of the particular parking location.

\* \* \* \* \*